United States Patent
Behan et al.

(10) Patent No.: US 11,682,047 B2
(45) Date of Patent: Jun. 20, 2023

(54) COGNITIVE ELEVATOR ADVERTISEMENTS

(71) Applicant: INTERNATIONAL BUSINESS MACHINES CORPORATION, Armonk, NY (US)

(72) Inventors: Anthony J. P. Behan, Killeagh (IE); Ninad Sathaye, Pune (IN); John Cohn, Richmond, VT (US); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 16/114,421

(22) Filed: Aug. 28, 2018

(65) Prior Publication Data

US 2020/0074508 A1 Mar. 5, 2020

(51) Int. Cl.
*G06Q 30/0251* (2023.01)
*G06Q 30/0242* (2023.01)
(Continued)

(52) U.S. Cl.
CPC ..... *G06Q 30/0271* (2013.01); *G06Q 30/0242* (2013.01); *G06Q 30/0255* (2013.01); *G06Q 30/0272* (2013.01); *G06V 40/172* (2022.01)

(58) Field of Classification Search
CPC .......... G06Q 30/0271; G06Q 30/0255; G06Q 30/0242; G06Q 30/0272; G06K 9/00288; G06V 40/172
See application file for complete search history.

(56) References Cited

U.S. PATENT DOCUMENTS 6,073,375 A 6/2000 Fant et al.
6,206,142 B1 3/2001 Meacham
(Continued)

FOREIGN PATENT DOCUMENTS

CN 201590217 U 9/2010
WO 00059818 A1 10/2000
WO 0108028 A2 2/2001

OTHER PUBLICATIONS

Digital Video Committee, "Guide to Digital Video Advertising", Interactive Advertising Bureau (IAB) Digital Video Center of Excellence, Sep. 2017, p. 19, section 3.6, www.iab.it/wp-content/uploads/2017/09/lab_guide_to_digital_video_advertising.pdf.
(Continued)

*Primary Examiner* — Mario C. Iosif
(74) *Attorney, Agent, or Firm* — Robert D. Bean

(57) ABSTRACT

A method, computer system, and computer program product for cognitive elevator advertisements are provided. The embodiment may include identifying one or more passengers utilizing real-time sensor data. The embodiment may also include determining a preference value of each identified passenger for a plurality of product categories based on a plurality of data related to past purchase histories or purchasing patterns received from a plurality of databases simultaneously or almost simultaneously. The embodiment may further include computing corrected passenger preference values for the plurality of product categories based on unprejudiced preference values of the passengers multiplied by the preference values assigned to each product category. The embodiment may also include determining one or more targeted advertisements for one or more targeted passengers based on each computed passenger preference values. The embodiment may further include displaying one or more advertisements on one or more display screens within an elevator based on the one or more targeted advertisements.

17 Claims, 6 Drawing Sheets

(51) Int. Cl.
*G06Q 30/0272* (2023.01)
*G06V 40/16* (2022.01)

(56) References Cited

U.S. PATENT DOCUMENTS

| | | | |
|---|---|---|---|
| 7,673,266 B2 | 3/2010 | Kamiyama | |
| 8,332,793 B2 | 12/2012 | Bose | |
| 8,719,743 B1 | 5/2014 | Kollaritsch | |
| 9,390,222 B2 | 7/2016 | Segal | |
| 9,471,742 B2 | 10/2016 | Chuang | |
| 2002/0036122 A1* | 3/2002 | Fayette | B66B 3/00 187/391 |
| 2002/0052776 A1* | 5/2002 | Rothman | G06Q 30/02 705/7.29 |
| 2002/0101392 A1 | 8/2002 | Hughes et al. | |
| 2002/0174025 A1 | 11/2002 | Hind | |
| 2011/0041369 A1 | 2/2011 | Uy | |
| 2011/0211739 A1* | 9/2011 | Eckhoff | G06Q 30/02 382/118 |
| 2012/0054020 A1* | 3/2012 | Jacobs | G06Q 30/0269 705/14.42 |
| 2012/0072936 A1 | 3/2012 | Small | |
| 2013/0293581 A1* | 11/2013 | Wissner-Gross | G06T 19/006 345/633 |
| 2014/0195345 A1 | 7/2014 | Lyren | |
| 2014/0207509 A1* | 7/2014 | Yu | G06Q 10/1095 705/7.19 |
| 2015/0096843 A1 | 4/2015 | Siddiqui et al. | |
| 2016/0035310 A1* | 2/2016 | Song | G06F 3/017 345/156 |
| 2016/0050185 A1* | 2/2016 | Wilson | H04L 63/0428 713/168 |
| 2016/0189215 A1 | 6/2016 | Bentley | |
| 2016/0286172 A1 | 9/2016 | Weng | |
| 2017/0068765 A1 | 3/2017 | Sinnadurai | |
| 2018/0099840 A1* | 4/2018 | Armistead | B66B 3/008 |
| 2018/0101873 A1 | 4/2018 | Cai et al. | |

OTHER PUBLICATIONS

Gaebler, "Elevator Advertising", http://www.gaebler.com/Elevator-Advertising.htm, accessed Aug. 17, 2018, 4 pages, Gaebler Ventures, Chicago, Illinois.

Mell, et al., "The NIST Definition of Cloud Computing," National Institute of Standards and Technology, U.S. Department of Commerce, Special Publication 800-145, Sep. 2011, pp. 1-7.

Vasquez, "Your client riding on an elevator. It's a great way to reach a captive audience of office workers", Media Life Magazine, Jan. 13, 2013, 3 pages, http://www.medialifemagazine.com/your-client-riding-on-an-elevator/.

Li, et al., "On Timing Model Extraction and Hierarchical Statistical Timing Analysis," IEEE Transactions on Computer-Aided Design of Integrated Circuits and Systems, May 14, 2017, 14 pages, vol. 32, Issue 3, arXiv:1705.04981v1, DOI: 10.1109/TCAD.2012.2228305, Retrieved from the Internet: <URL: https://ieeexplore.ieee.org/document/6461978>.

* cited by examiner

COGNITIVE ELEVATOR ADVERTISEMENTS

BACKGROUND

The present invention relates, generally, to the field of computing, and more particularly to elevator advertising systems.

Elevator advertising may relate to displaying high-resolution commercial advertisements on digital screens placed inside elevators in high traffic buildings usually paid for by advertisement sponsors. Elevator advertising is believed to be a highly effective method of advertising products or services as each advertisement is likely to receive the full attention of elevator passengers. If an elevator is located in an apartment building or office complex, some individuals have to view the advertisements every single day. Elevator advertising is unique in that the audience is usually not able to switch channels on advertising screens or turn the advertising pages. Also, generally, there are fewer distractions inside elevators as people have poor, or almost no, mobile receptions therein. If the average number of riders in a high-rise building is 300 people per day, and over a six-month period, that will amount to approximately 54,000 views of an advertisement. Typically, the digital screen inside elevators rolls advertisements at specified time intervals. However, digital elevator advertising systems are now developing into systems where a digital wallpaper with advertisements change based on businesses or residents located on each floor of a building.

SUMMARY

According to one embodiment, a method, computer system, and computer program product for cognitive elevator advertisements are provided. The embodiment may include identifying one or more passengers utilizing real-time sensor data. The embodiment may also include determining a preference value of each identified passenger for a plurality of product categories based on a plurality of data related to past purchase histories or purchasing patterns received from a plurality of databases simultaneously or almost simultaneously. The embodiment may further include computing corrected passenger preference values for the plurality of product categories based on unprejudiced preference values of the passengers multiplied by the preference values assigned to each product category. The embodiment may also include determining one or more targeted advertisements for one or more targeted passengers based on each computed passenger preference values. The embodiment may further include displaying one or more advertisements on one or more display screens within an elevator based on the one or more targeted advertisements.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
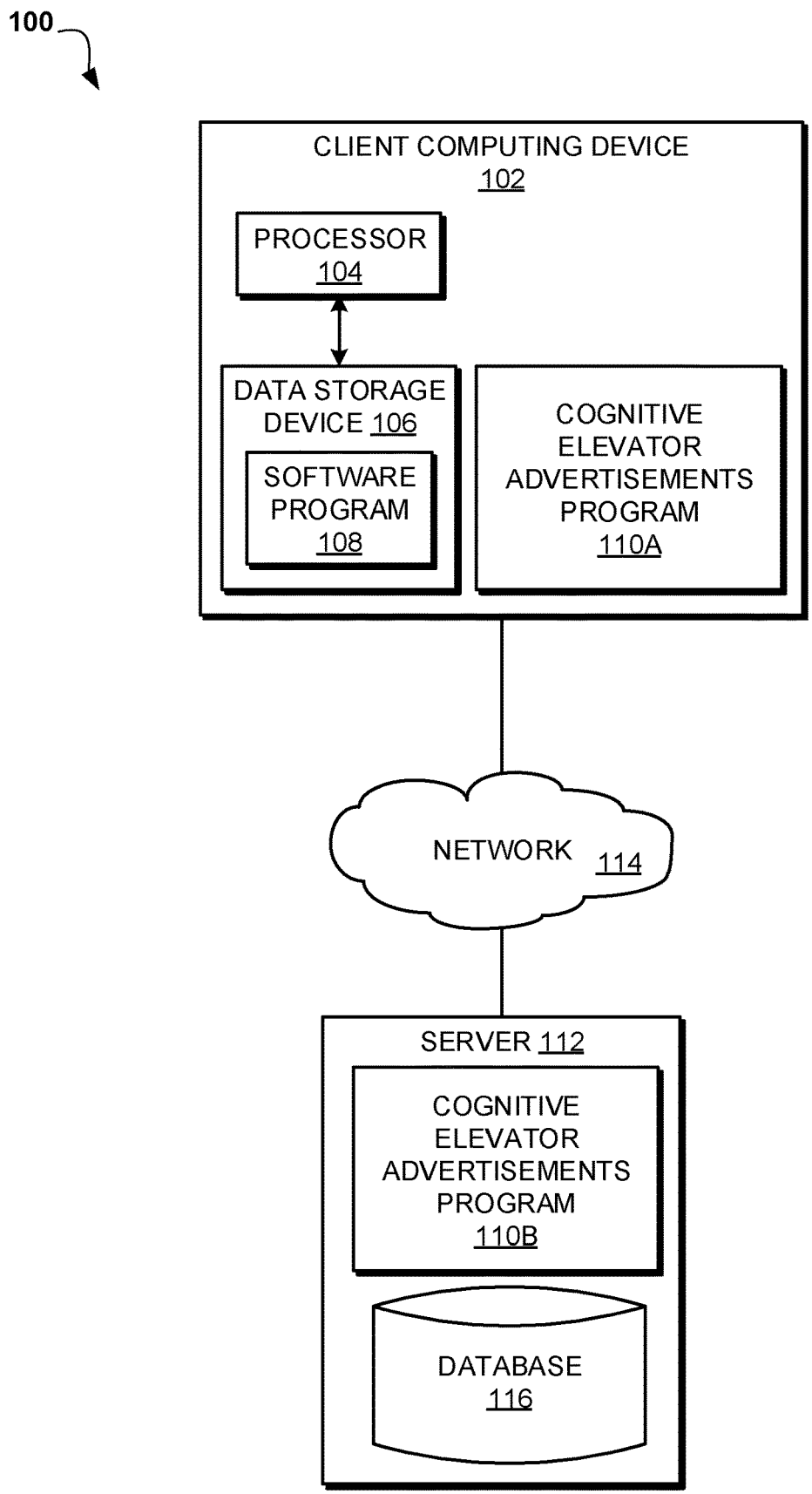
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to cognitive elevator advertisements systems. The following described exemplary embodiments provide a system, method, and program product to, among other things, allow a user to collect real-time data in elevators and elevators lobbies and analyze it to identify passengers and prioritize advertisements based on various Key Performance Indicators (KPIs) and optimize the placement of the advertisements inside elevators. Therefore, the present embodiment has the capacity to improve the technical field of elevator advertising systems by efficiently allowing users to provide specific and interesting advertisements to passengers and increase the probability of revenue generation. Moreover, the present embodiment may allow a user to collect feedback on the advertisements to record and analyze the efficacy of the advertisements.

As previously described, elevator advertising may relate to displaying high-resolution commercial advertisements on the screens placed inside elevators in high traffic buildings usually paid for by advertisement sponsors. Elevator advertising is believed to be a highly effective method of advertising products or services as each advertisement is likely to receive the full attention of elevator passengers. Elevator advertising is unique in that audience is usually not able to switch channels on advertising screens or turn the advertising pages. Also, generally, there are fewer distractions inside elevators as people have poor or almost no mobile receptions therein. If the average number of riders in a high-rise building is 300 people per day, and over a six-month period, that will amount to approximately 54,000 views of an advertisement. Typically, the digital screen inside elevators rolls advertisements at specified time intervals.

Although elevator advertising has existed for a very long time, such advertising typically has been a static, mistargeted or general advertising tool that runs in a loop rather than a specifically pre-programmed manner. These advertisements are not specific or interesting to people in elevators as they are not time nor context-sensitive, and it could possibly lead to substantial revenue loss to advertisers. As such, it may be advantageous to, among other things, implement a system capable of collecting real-time data related to passengers of an elevator, prioritizing advertisements based on various factors, optimizing placement of the advertisements inside an elevator, and providing specific and interesting advertisements to passengers, which may increase revenue generation. It may be also advantageous to implement a system capable of collecting feedback on the efficacy of advertisements inside an elevator and improving advertisements based on an analysis of the collected feedback.

According to one embodiment, a cognitive elevator advertisements program may collect and stream real-time data of passengers from an elevator or elevator lobbies to canonically identify the elevator passengers, determine the most valuable passengers based on various factors, and select advertisements for those passengers. In at least one other embodiment, a cognitive elevator advertisements program may evaluate the most suitable screen to display the personalized advertisements and collect feedback or information related to how long a passenger was viewing an advertisement or what the facial expression was like when viewing the advertisement.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for cognitive elevator advertisements.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a cognitive elevator advertisements program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a cognitive elevator advertisements program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the cognitive elevator advertisements program 110A, 110B may be a program capable of identifying a plurality of elevator passengers based on real-time data of the passengers collected from camera or image recognition systems placed inside an elevator or elevator lobbies and prioritizizng advertisements for the passengers based on their preference values for cetain product categories. The cognitive elevator advertisements program 110A, 110B may also evaluate the most suitable position of display screens inside an elevator to display the selected advertisements and collect feedback to improve the displayed advertisements in the future. The cognitive elevator advertisements process is explained in further detail below with respect to FIG. 2.

Figure 2:
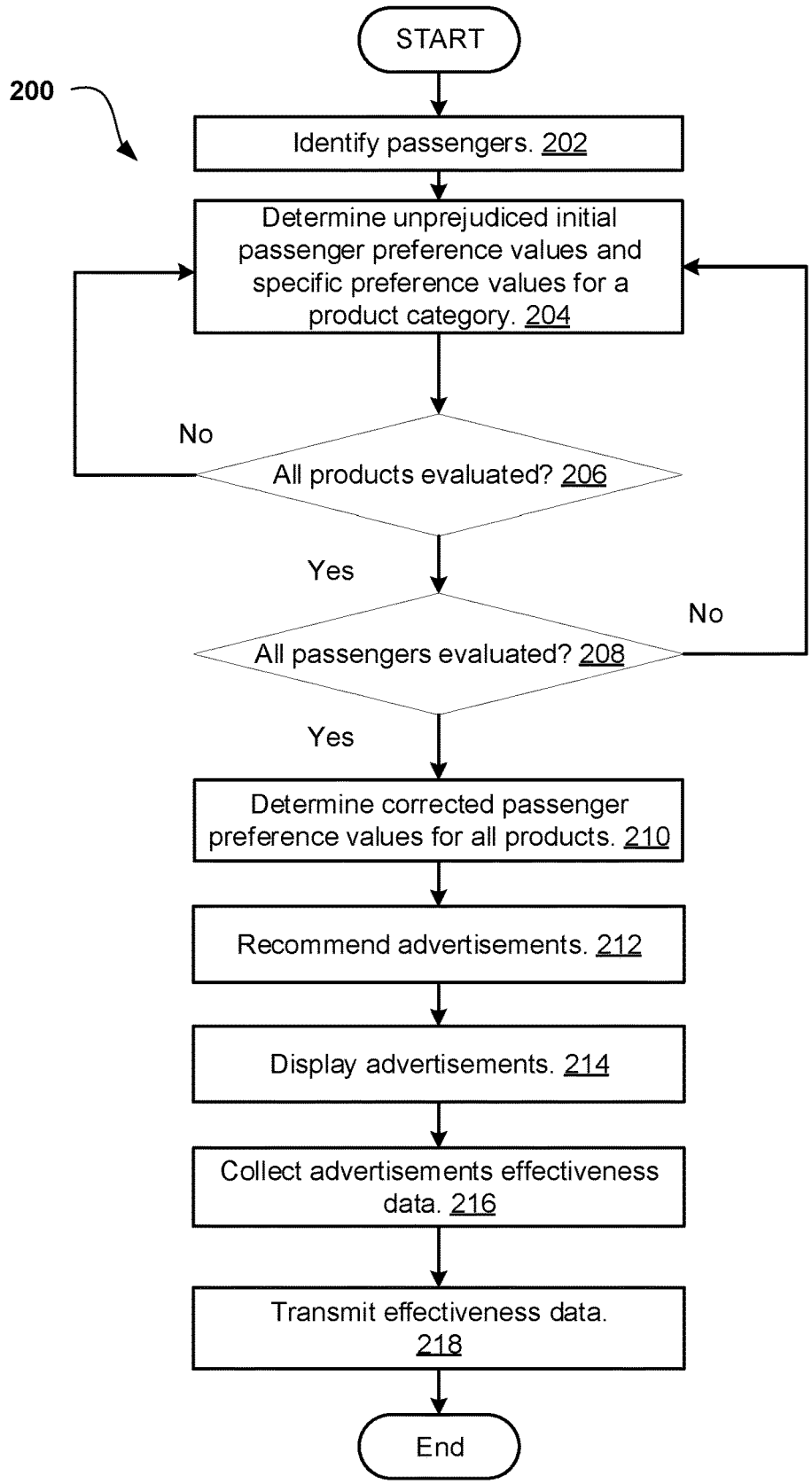
FIG. 2 is an operational flowchart illustrating a cognitive elevator advertisements process according to at least one embodiment.

FIG. 2 is an operational flowchart illustrating a cognitive elevator advertisements process 200 according to at least one embodiment. At 202, the cognitive elevator advertisements program 110A, 110B identifies passengers. According to one embodiment, the cognitive elevator advertisements program 110A, 110B may collect and stream real-time sensor data including passengers' origins, destinations, and appearances from an elevator or elevator lobbies. For example, the cognitive elevator advertisements program 110A, 110B may receive image data from a camera system in an elevator or elevator lobbies and utilize image recognition analyses to identify a passenger. In at least one other embodiment, the cognitive elevator advertisements program 110A, 110B may collect specific information as to a certain passenger, such as, name, age, social profile, the time and the date of the last visit through Bluetooth® connectivity (Bluetooth and all Bluetooth-related trademarks and logos are trademarks or registered trademarks of BLUETOOTH SIG, Inc. and/or its affiliates), ID card swipe, Near Field Communication (NFC), and an application running on user devices as a passenger walks into a lobby or an elevator.

At 204, the cognitive elevator advertisements program 110A, 110B determines unprejudiced initial passenger preference values each passenger and specific preference values for a product category. According to one embodiment, the cognitive elevator advertisements program 110A, 110B may determine a passenger's preference for various product categories in numeric values utilizing a plurality of data related to the passenger's past purchase history or spending patterns received from a plurality of databases simultaneously or almost simultaneously. For example, the cognitive elevator advertisements program 110A, 110B may generally rank passengers and assign preference values on a 0 to 10 scale with a decimal point based on their past purchase history. In at least one other embodiment, the cognitive elevator advertisements program 110A, 110 may receive certain data associated with a passenger's past purchase histories or purchase patterns (e.g. "likes" or "dislikes" on products or events on social media sites). Table 1 below illustrates how preference values are assigned to the passengers A-F with respect to four product categories, movie tickets, grocery, home improvement and auto products. The numbers in the second column represent numbers without taking into account passengers' affinity or particular interests in specific products. These numbers may be calculated based on the passengers' past behaviors in general with respect to their overall purchasing activities during a certain period of time in the past, or frequency of their past visits to the premises. The numbers illustrated in the third through the fifth column represents the passengers' preference values for each product category. For example, as passengers B and D have no interest in purchasing a movie ticket based on analyses of the data related to the passengers' past purchase history which the cognitive elevator advertisements program 110A, 110B received from a polarity of databases, and thus, the cognitive elevator advertisements program 110A, 110B may assign 0 scores to the passenger B and D with respect to a movie ticket category.

TABLE 1

| Passenger | Unprejudiced Preference Values | Passenger Preference (0-10) for Different Product Categories | | | |
|---|---|---|---|---|---|
| | | Movie Tickets | Grocery | Home Improvement | Auto Products |
| A | 8.8 | 5 | 4 | 9 | 7 |
| B | 7 | 0 | 6 | 6 | 6 |
| C | 5.5 | 2 | 2 | 0 | 4 |
| D | 10 | 0 | 3 | 10 | 6 |
| E | 3.4 | 6 | 4 | 2 | 4 |
| F | 2 | 10 | 4 | 0 | 4 |

At 206, the cognitive elevator advertisements program 110A, 110B determines whether all products have been evaluated. According to one embodiment, the cognitive elevator advertisements program 110A, 110B may determine whether each product has been assigned preference values based on the past purchase history of each passenger. For example, the cognitive elevator advertisements program 110A, 110B may determine that all preference values for Movie Tickets, Grocery, Home Improvement, and Products have been assigned for Passenger A. If the cognitive elevator advertisements program 110A, 110B determines all products have been evaluated (step 206, "Yes" branch), then the cognitive elevator advertisements program 110A, 110B may continue to step 208 to determine whether all the passengers have been evaluated. If the cognitive elevator advertisements program 110A, 110B determines that the number assigned for a product category is incomplete (step 206, "No" branch), then the cognitive elevator advertisements program 110A, 110B may return to step 204 to evaluate remaining product categories.

At 208, the cognitive elevator advertisements program 110A, 110B determines whether all passengers have been evaluated. According to one embodiment, if the cognitive elevator advertisements program 110A, 110B determines that assigning preference values for a passenger is not complete (step 208, "No" branch), then the cognitive elevator advertisements program 110A, 110B may return to step 204 to continue to compute preference values for remaining passengers. If the cognitive elevator advertisements program 110A, 110B determines that all passengers' preference values are computed (step 208, "Yes" branch), then the cognitive elevator advertisements program 110A, 110B may continue to step 210 to determine corrected passenger preference values.

At 210, the cognitive elevator advertisements program 110A, 110B determines corrected passenger preference values for all products. According to one embodiment, the cognitive elevator advertisements program 110A, 110B may calculate corrected passenger preference values by computing the numbers illustrated above in Table 1. For example, the cognitive elevator advertisements program 110A, 110B may multiply unprejudiced preference value by the scores assigned to each passenger with respect to each product category and obtains the numbers represented in Table 2 below. Passenger A's corrected preference value for Movie Tickets is 44 (e.g. 8.8×5) and 35.2 for Grocery (e.g. 8.8×4). The numbers in the last row represent the total values for each product category. For example, the Home Improvement category's total preference value is the largest (e.g. 228) and the Movie Tickets' total preference value is the smallest (e.g. 95.4). In at least one other embodiment, the cognitive elevator advertisements program 110A, 110B may utilize other methods of computation to obtain corrected preference values, such as weighted average or standard deviation.

TABLE 2

| Passenger | Corrected Passenger Preference Values | | | |
|---|---|---|---|---|
| | Movie Tickets | Grocery | Home Improvement | Auto Products |
| A | 44 | 35.2 | 79.2 | 61.6 |
| B | 0 | 42 | 42 | 42 |
| C | 11 | 11 | 0 | 22 |
| D | 0 | 30 | 100 | 60 |
| E | 20.4 | 13.6 | 6.8 | 13.6 |
| F | 20 | 8 | 0 | 8 |
| Total Preference Values | 95.4 | 139.8 | 228 | 207.2 |

At 212, the cognitive elevator advertisements program 110A, 110B recommends advertisements based on the corrected preference values for all products. According to one embodiment, the cognitive elevator advertisements program 110A, 110B may recommend advertisements related to a product category that received the highest score or the largest preference values in step 204. For example, in Table 2, the total preference value for home improvement product received 228 points and movie tickets received 95.4 points. The cognitive elevator advertisements program 110A, 110B may prioritize the advertisement in accordance with the total preference values and recommend displaying the advertisements related to home improvement products first. In at least one other embodiment, the cognitive elevator advertisements program 110A, 110B may only select one or more passengers as the most valuable passengers and evaluate their preference values for each product category to select and recommend advertisements on the product categories with large preference values. For example, in Table 2, the cognitive elevator advertisements program 110A, 110B may select Passenger A or Passenger A and Passenger C together as the most valuable passengers to evaluate their preference value for each product category. In this example, the cognitive elevator advertisements program 110A, 110B may select and recommend advertising home improvement products as the total preference value is 179.2 (e.g. 100+79.2). Further, in at least one other embodiment, the cognitive elevator advertisements program 110A, 110B may determine the most valuable passengers by analyzing their past purchase histories including the total values of the past purchases, previous responses or reactions to similar advertisements or the predicted duration of a particular passenger's elevator ride.

At 214, the cognitive elevator advertisements program 110A, 110B displays the recommended advertisements. According to one embodiment, the cognitive elevator advertisements program 110A, 110B may select the recommended advertisements and display the advertisements on one or more display screens placed inside an elevator simultaneously or almost simultaneously. In at least one other embodiment, the cognitive elevator advertisements program 110A, 110B may display the advertisements on one or more screens in a prioritized manner based on the location of the screen relative to the most valuable passengers. For example, if a passenger standing in the far-left side corner of an elevator is determined to be one of the most valuable passenger by the cognitive elevator advertisements program 110A, 110B, the cognitive elevator advertisements program 110A, 110B may utilize camera systems, image analysis systems or pre-configured algorithms to determine and select one or more screens that are the nearest to the most valuable passenger or has the least obstruction in sight (e.g. any other passengers blocking the view). Further, the cognitive elevator advertisements program 110A, 110B may predict the amount of time a certain passenger will remain in an elevator to determine when to stop the currently running advertisements and start to display the recommended advertisements for that particular passenger. The cognitive elevator advertisements program 110A, 110B may also dynamically modify advertisements display time by analyzing predicted viewership of each passenger and advertisements queue for the next valuable passenger. For example, in Table 2, when the cognitive elevator advertisements program 110A, 110B first displays the advertisements related to home improvement products for passenger A and D in one or more display screens, and then determines to display advertisements related to auto products for passenger A, C and D next, the cognitive elevator advertisements program 110A, 110B may shorten the length of the display time of the advertisements related to the home improvement products compared to that of the auto products advertisements if passenger A is predicted to leave the elevator on the 3rd floor as opposed to passenger C and D being predicted to leave the elevator on the $12^{th}$ floor. Further, in at least one other embodiment, the cognitive elevator advertisements program 110A, 110B may determine which display screen is the most effective display screen for a particular passenger utilizing certain algorithms.

At 216, the cognitive elevator advertisements program 110A, 110B collects advertisements effectiveness data. The cognitive elevator advertisements program may assess the effectiveness of the recommended advertisements by analyzing a particular passenger's facial micro-expressions, distance from the display screens, duration of the passenger's gaze while in an elevator. For example, the cognitive elevator advertisements program 110A, 110B may utilize camera or image recognition systems to analyze a passenger's eye movement or how a passenger is reacting to an advertisement (e.g. smiling, surprised, raising an eyebrow, yawning, etc). The cognitive elevator advertisements program 110A, 110B may utilize certain algorithms to calculate a threshold value for a minimum gaze duration of a passenger to determine whether an advertisement is effective or not. The cognitive elevator advertisements program 110A, 110B may further analyze a passenger's distance from one or more display screens simultaneously or almost simultaneously and determine whether a passenger is focusing on a display screen compared to a predetermined threshold value computed by pre-configured program or algorithms.

At 218, the cognitive elevator advertisements program 110A, 110B transmits the effectiveness data. According to one embodiment, the cognitive elevator advertisements program 110A, 110B may transmit the analyzed effectiveness data to a plurality of databases so that sponsors of the displayed advertisements may retrieve the relevant data and improve their advertisements in the future. In at least one other embodiment, the cognitive elevator advertisements program 110A, 110B may generate a report summarizing the analyses of the effectiveness of the advertisement and provide a user or a third-party sponsor with the generated report.

Figure 3:
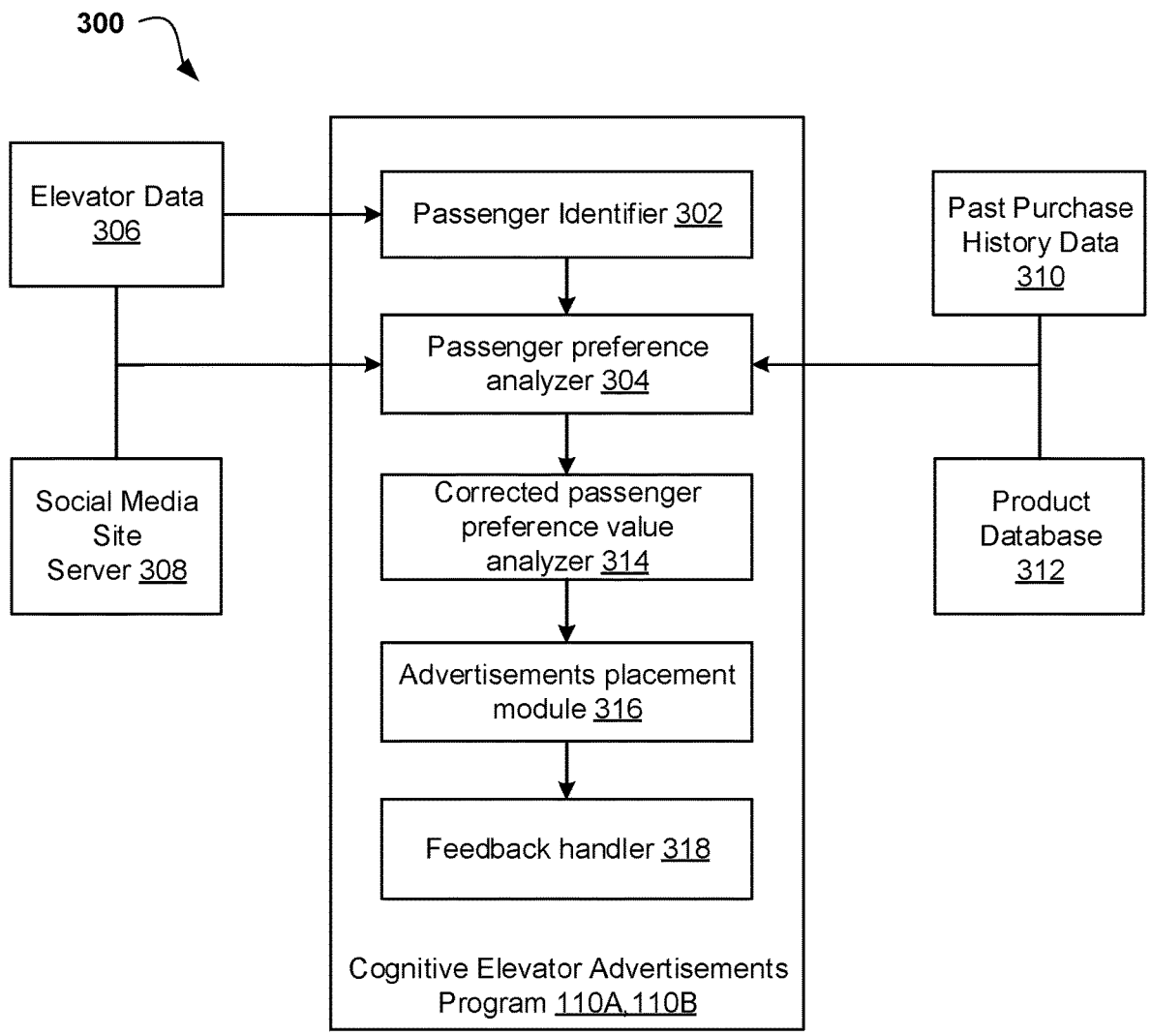
FIG. 3 is a functional block diagram of a cognitive elevator advertisements platform according to at least one embodiment.

Referring now to FIG. 3, a functional block diagram of a cognitive elevator advertisements platform 300 is depicted according to at least one embodiment. According to one embodiment, the cognitive elevator advertisements program 110A, 110B may include the passenger identifier 302, the passenger preference analyzer 304, the corrected passenger preference value analyzer 314, the placement of the advertisements module 316 and the feedback handler 318. The passenger identifier 302 may identify passengers and collect elevator data 306 including passengers' origins, destinations, appearances from an elevator or elevator lobbies. The passenger preference analyzer 304 may receive elevator data 306, past purchase history data 310 and other available data associated with passengers' past purchase histories or patterns form a social media site server 308 and a product database 312 and analyze each passenger's preference level in numeric values for each product category that may be purchased on the premises. The corrected passenger preference value analyzer 314 may compute the total preference values for each product and each passenger and determine which products received the largest values in total. The advertisements placement module 316 may place advertisements for the product categories that received the largest values or highest scores on one or more display screens inside an elevator in a prioritized manner. The feedback handler 318 may evaluate each advertisement's effectiveness based on the duration of a passenger gaze, the distance between display screens and a passenger and facial expressions of a passenger. The feedback handler 318 may provide a user or sponsors of an advertisement with feedback data or a generated report summarizing the effectiveness of an advertisement.

It may be appreciated that FIGS. 2-3 provide only an illustration of one implementation and do not imply any limitations with regard to how different embodiments may be implemented. Many modifications to the depicted environments may be made based on design and implementation requirements. For example, in at least one embodiment, the cognitive elevator advertisements program 110A, 110B may self-improve and adjust display time on one or more display screens after the cognitive elevator advertisements program 110A, 110B analyzes the effectiveness of advertisements.

Figure 4:
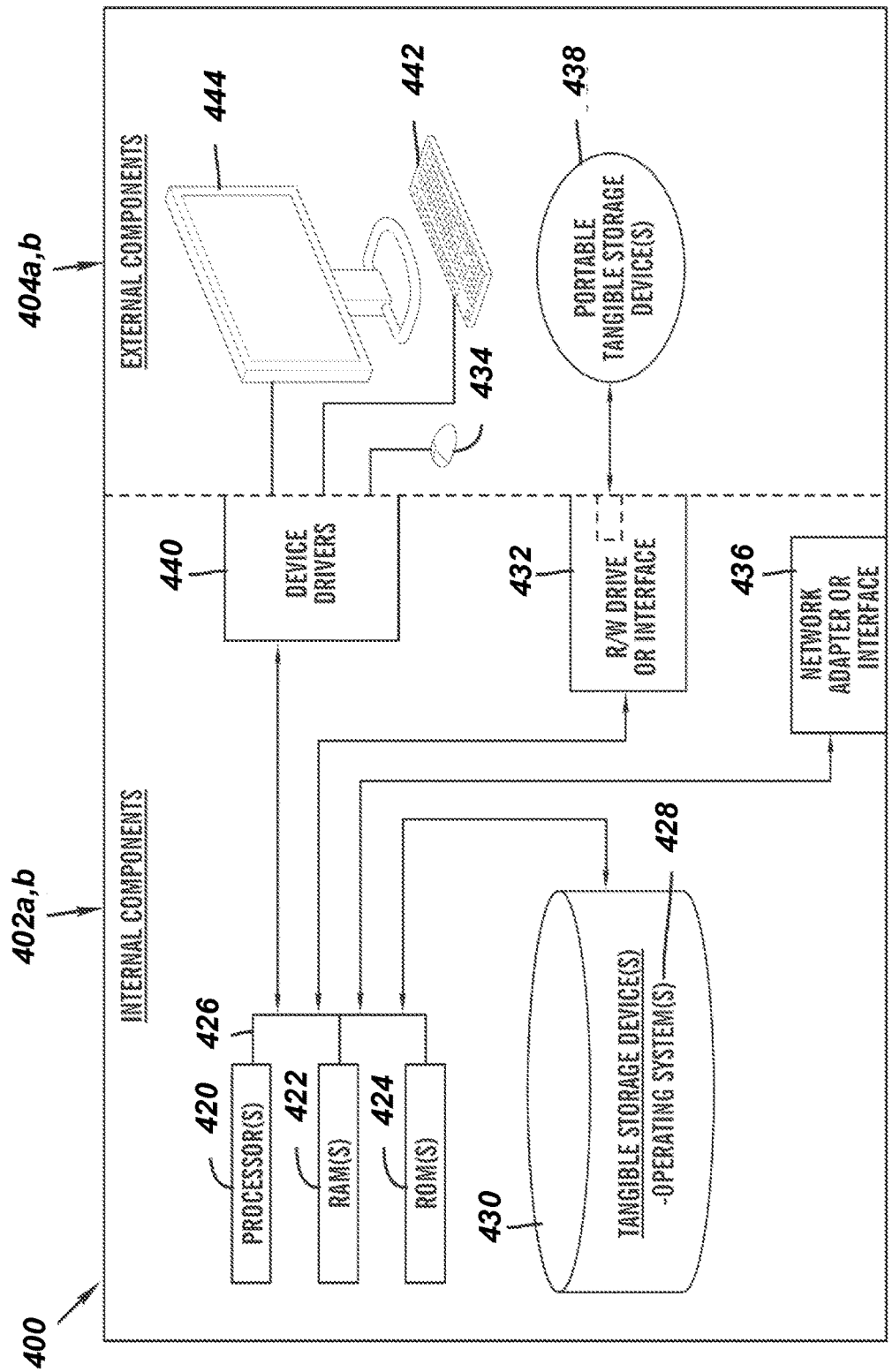
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402a,b and external components 404a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the cognitive elevator advertisements program 110A in the client computing device 102 and the cognitive elevator advertisements program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes an R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the cognitive elevator advertisements program 110A, 110B, can be stored on one or more of the respective portable computer-readable tangible storage devices 438, read via the respective R/W drive or interface 432 and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 and the cognitive elevator advertisements program 110A in the client computing device 102 and the cognitive elevator advertisements program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the cognitive elevator advertisements program 110A in the client computing device 102 and the cognitive elevator advertisements program 110B in the server 112 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment, models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 5:
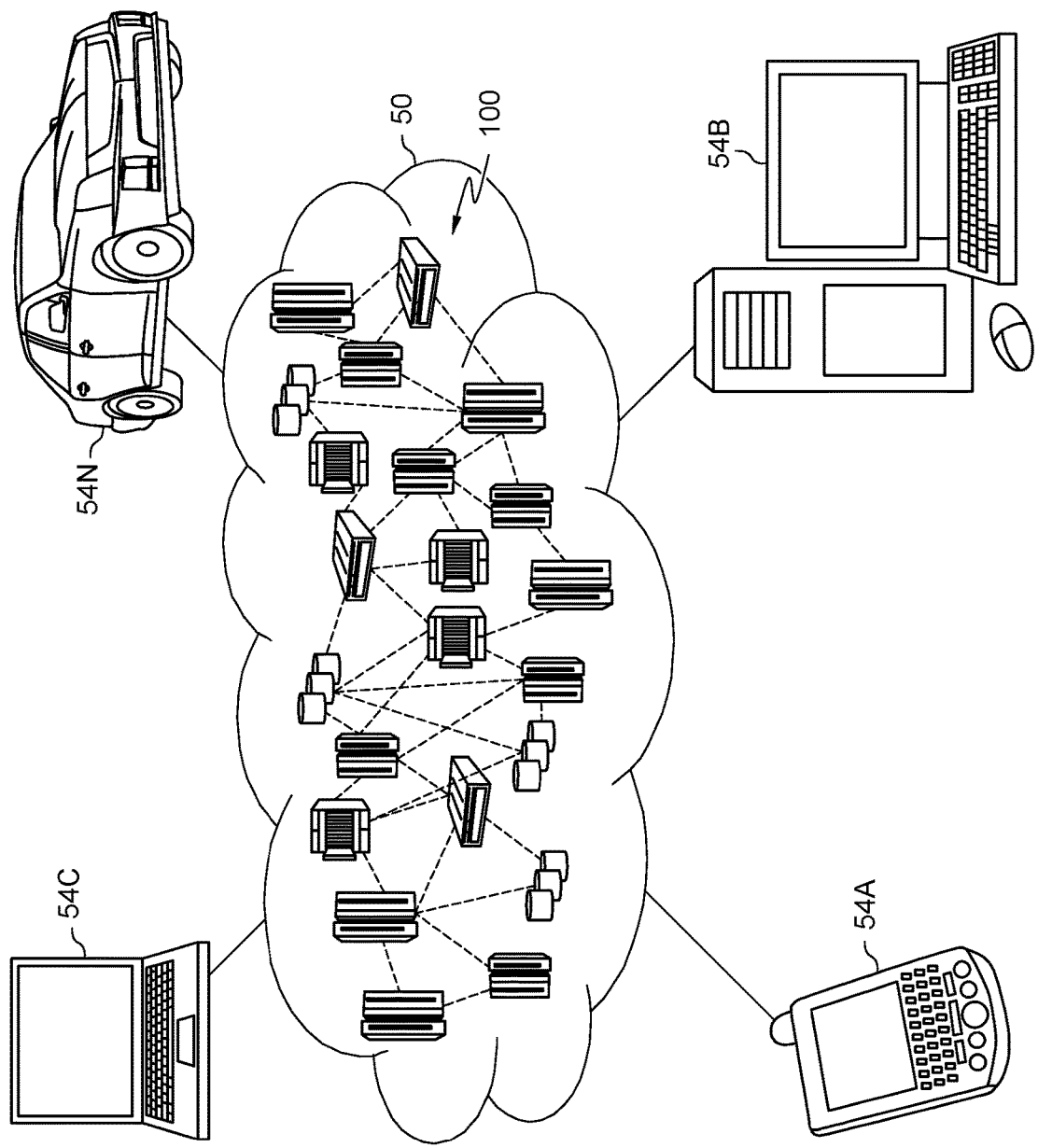
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
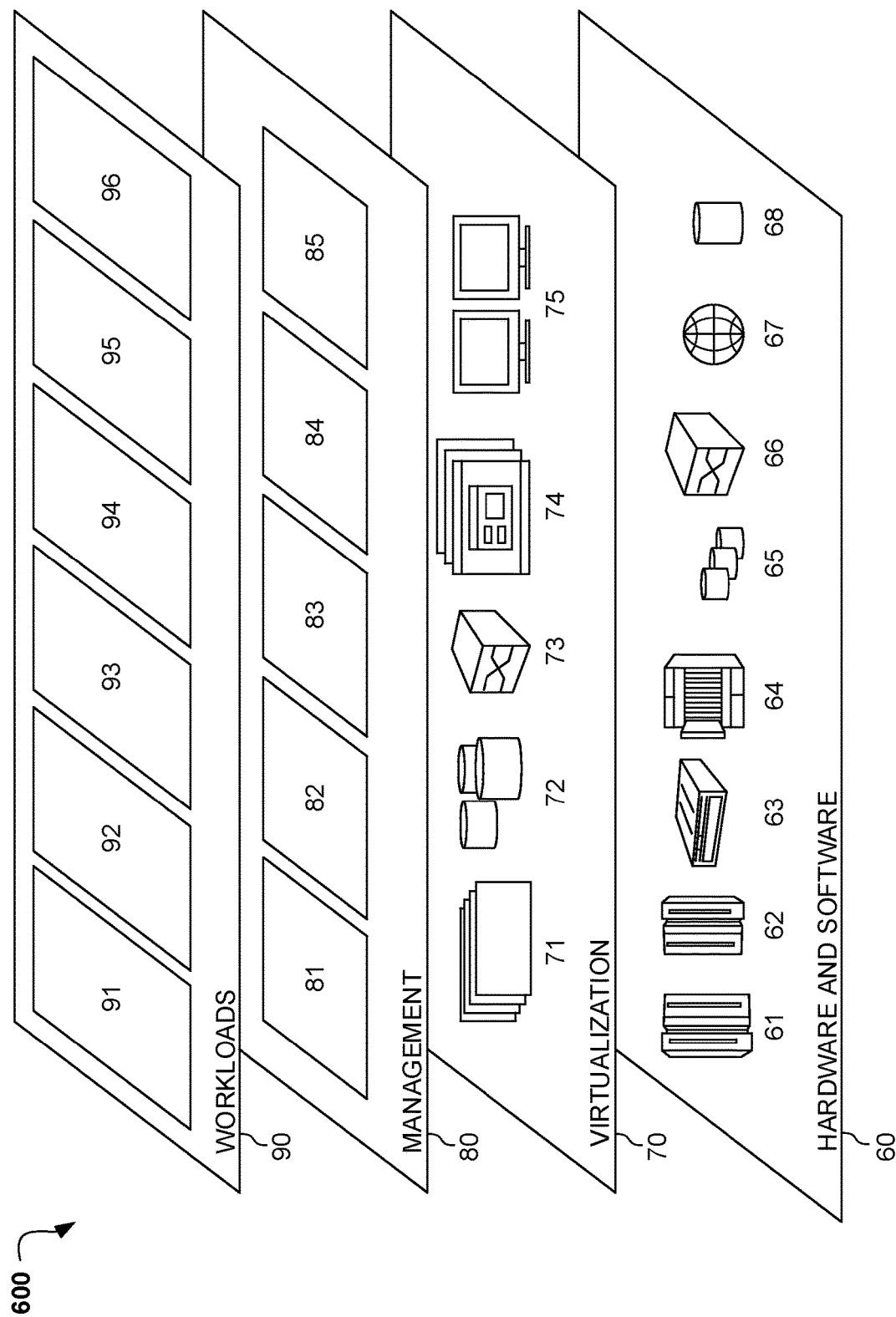
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive elevator advertisements 96. Cognitive elevator advertisements 96 may relate to generating a database of feedback on advertisements effectiveness or determining which product category needs to be advertised first, monitoring various databases, social media site servers, email servers or a user device such as a mobile phone for a passenger's purchase histories or previous activities.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for cognitive elevator advertisements, the method comprising:

identifying, by a processor, a plurality of passengers utilizing real-time sensor data;

determining, by the processor, a preference value of each identified passenger for a plurality of product categories based on a plurality of data related to past purchase histories or purchasing patterns received from a plurality of databases simultaneously or almost simultaneously;

computing, by the processor, corrected passenger preference values for the plurality of product categories based on weighted average or standard deviation of the determined preference values of the plurality of passengers;
selecting, by the processor, most valuable passengers from the plurality of passengers based on total value of past purchases, previous responses to similar elevator advertisements, and a predicted duration of a passenger's stay in the elevator;
determining, by the processor, one or more targeted advertisements for the most valuable passengers based on each computed passenger preference values;
evaluating, by the processor, one or more suitable screens of a plurality of screens to display targeted advertisements, including a most suitable position of display screens inside an elevator to display the targeted advertisements, utilizing an algorithm which computes the most ideal angle or distance between a display screen and one or more passengers of the plurality of passengers;
determining, by the processor, effectiveness of the one or more targeted advertisements by simultaneously analyzing, using a camera, facial micro-expressions of one or more targeted passengers and one or more targeted passengers' distances from the one or more display screens, whether the one or more targeted passengers are focusing on the one or more display screens is determined utilizing an algorithm based on a comparison to a pre-configured threshold value or a pre-determined distance;
modifying, dynamically, an advertisement display time for one or more displayed advertisements by analyzing a predicted time of viewership of one or more passengers and an advertisement queue for a next passenger; and
simultaneously displaying, by the processor, on a most suitable screen of the one or more display screens, one or more targeted advertisements based on the evaluating and the advertisement display time.

2. The method of claim 1, wherein the real-time sensor data is received from a camera or an image recognition system placed inside an elevator or in a lobby.

3. The method of claim 1, wherein the plurality of data related to the past purchase histories or the purchasing patterns of each user is received from a social media site.

4. The method of claim 1, further comprising:
selecting a most valuable passenger from the plurality of passengers based on total value of past purchases, previous responses to similar elevator advertisements, and a predicted duration of a passenger's stay in the elevator.

5. The method of claim 4, further comprising:
determining one or more recommended advertisements for the most valuable passenger; and
displaying the one or more recommended advertisements for the most valuable passenger first.

6. The method of claim 1, further comprising:
collecting advertisement effectiveness data to generate related reports; and
providing a user with the advertisement effectiveness data or the generated reports.

7. A computer system for cognitive elevator advertisements, the system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising the steps of:
identifying, by a processor, a plurality of passengers utilizing real-time sensor data;
determining, by the processor, a preference value of each identified passenger for a plurality of product categories based on a plurality of data related to past purchase histories or purchasing patterns received from a plurality of databases simultaneously or almost simultaneously;
computing, by the processor, corrected passenger preference values for the plurality of product categories based on weighted average or standard deviation of the determined preference values of the plurality of passengers;
selecting, by the processor, most valuable passengers from the plurality of passengers based on total value of past purchases, previous responses to similar elevator advertisements, and a predicted duration of a passenger's stay in the elevator;
determining, by the processor, one or more targeted advertisements for the most valuable passengers based on each computed passenger preference values;
evaluating, by the processor, one or more suitable screens of a plurality of screens to display targeted advertisements, including a most suitable position of display screens inside an elevator to display the targeted advertisements, utilizing an algorithm which computes the most ideal angle or distance between a display screen and one or more passengers of the plurality of passengers;
determining, by the processor, effectiveness of the one or more targeted advertisements by simultaneously analyzing, using a camera, facial micro-expressions of one or more targeted passengers and one or more targeted passengers' distances from the one or more display screens, whether the one or more targeted passengers are focusing on the one or more display screens is determined utilizing an algorithm based on a comparison to a pre-configured threshold value or a pre-determined distance;
modifying, dynamically, an advertisement display time for one or more displayed advertisements by analyzing a predicted time of viewership of one or more passengers and an advertisement queue for a next passenger; and
simultaneously displaying, by the processor, on a most suitable screen of the one or more display screens, one or more targeted advertisements based on the evaluating and the advertisement display time.

8. The computer system of claim 7, wherein the real-time sensor data is received from a camera or an image recognition system placed inside an elevator or in a lobby.

9. The computer system of claim 7, wherein the plurality of data related to the past purchase histories or the purchasing patterns of each user is received from a social media site.

10. The computer system of claim 7, further comprising:
selecting a most valuable passenger from the plurality of passengers based on total value of past purchases, previous responses to similar elevator advertisements, and a predicted duration of a passenger's stay in the elevator.

11. The computer system of claim 10, further comprising:
determining one or more recommended advertisements for the most valuable passenger; and displaying the one or more recommended advertisements for the most valuable passenger first.

12. The computer system of claim 7, further comprising:
collecting advertisement effectiveness data to generate related reports; and
providing a user with the advertisement effectiveness data or the generated reports.

13. A computer program product for cognitive elevator advertisements, the computer program product comprising:
one or more computer-readable tangible storage medium and program instructions stored on at least one of the one or more tangible storage medium, the program instructions executable by a processor to cause the processor to perform a method comprising the steps of:
identifying, by a processor, a plurality of passengers utilizing real-time sensor data;
determining, by the processor, a preference value of each identified passenger for a plurality of product categories based on a plurality of data related to past purchase histories or purchasing patterns received from a plurality of databases simultaneously or almost simultaneously;
computing, by the processor, corrected passenger preference values for the plurality of product categories based on weighted average or standard deviation of the determined preference values of the plurality of passengers;
selecting, by the processor, most valuable passengers from the plurality of passengers based on total value of past purchases, previous responses to similar elevator advertisements, and a predicted duration of a passenger's stay in the elevator;
determining, by the processor, one or more targeted advertisements for the most valuable passengers based on each computed passenger preference values;
evaluating, by the processor, one or more suitable screens of a plurality of screens to display targeted advertisements, including a most suitable position of display screens inside an elevator to display the targeted advertisements, utilizing an algorithm which computes the most ideal angle or distance between a display screen and one or more passengers of the plurality of passengers;
determining, by the processor, effectiveness of the one or more targeted advertisements by simultaneously analyzing, using a camera, facial micro-expressions of one or more targeted passengers and one or more targeted passengers' distances from the one or more display screens, whether the one or more targeted passengers are focusing on the one or more display screens is determined utilizing an algorithm based on a comparison to a pre-configured threshold value or a pre-determined distance;
modifying, dynamically, an advertisement display time for one or more displayed advertisements by analyzing a predicted time of viewership of one or more passengers and an advertisement queue for a next passenger; and
simultaneously displaying, by the processor, on a most suitable screen of the one or more display screens, one or more targeted advertisements based on the evaluating and the advertisement display time.

14. The computer program product of claim 13, wherein the real-time sensor data is received from a camera or an image recognition system placed inside an elevator or in a lobby.

15. The computer program product of claim 13, wherein the plurality of data related to the past purchase histories or the purchasing patterns of each user is received from a social media site.

16. The computer program product of claim 13, further comprising:
selecting a most valuable passenger from the plurality of passengers based on total value of past purchases, previous responses to similar elevator advertisements, and a predicted duration of a passenger's stay in the elevator.

17. The computer program product of claim 16, further comprising:
determining one or more recommended advertisements for the most valuable passenger; and
displaying the one or more recommended advertisements for the most valuable passenger first.

* * * * *